US00RE36646E

United States Patent [19]

Akamine et al.

[11] E Patent Number: Re. 36,646

[45] Reissued Date of Patent: Apr. 4, 2000

[54] SPEECH CODING SYSTEM UTILIZING A RECURSIVE COMPUTATION TECHNIQUE FOR IMPROVEMENT IN PROCESSING SPEED

[75] Inventors: Masami Akamine; Yuji Okuda; Kimio Miseki, all of Tokyo, Japan

[73] Assignee: Kabushiki Kaisha Toshiba, Kawasaki, Japan

[21] Appl. No.: 08/504,227

[22] Filed: Jul. 19, 1995

Related U.S. Patent Documents

Reissue of:

[64] Patent No.: 5,230,036
Issued: Jul. 20, 1993
Appl. No.: 07/598,989
Filed: Oct. 17, 1990

[30] Foreign Application Priority Data

Oct. 17, 1989 [JP] Japan ..... 1-268050
Feb. 27, 1990 [JP] Japan ..... 2-44405

[51] Int. Cl.[7] ..... G10L 9/00

[52] U.S. Cl. ..... 704/223; 704/219

[58] Field of Search ..... 395/2.09, 2.28, 395/2.69, 2.71, 2.75; 704/200, 219, 223, 264, 262, 265, 220, 221, 222, 266

[56] References Cited

U.S. PATENT DOCUMENTS 4,899,385 2/1990 Ketchum et al. ..... 395/2.32
4,932,061 6/1990 Kroon et al. ..... 395/2.32
4,944,013 7/1990 Gouvianakis ..... 395/2.28

OTHER PUBLICATIONS

Proc. IEEE ICASSP–87.31.9; Daniel Lin, "Speech coding using pseudo–stochastic blok codes"; pp. 1354–1357, Sep. 1987.

*Primary Examiner*—Richemond Dorvil
*Attorney, Agent, or Firm*—Oblon, Spivak, McClelland, Maier & Nesutadt, P.C.

[57] ABSTRACT

This invention provides a novel speech coding system which recursively executes a filter-applied "Toeplitz characteristic" by causing a drive signal (i.e., an excitation signal) to be converted into a "Toeplitz matrix" when detecting a pitch period in which distortion of the input vector and the vector subsequent to the application of filter-applied computation to the drive signal vector in the pitch forecast called either "closed loop" or "compatible code book" is minimized. The vector quantization method substantially making up the speech coding system of the invention is characteristically used by the system.

7 Claims, 14 Drawing Sheets

$$B=(B_a, B_{a+1} \cdots B_b)=\begin{bmatrix} e(-a) & e(-a-1) & & e(-b+1) & e(-b) \\ e(-a+1) & e(-a) & & e(-b+2) & e(-b+1) \\ e(-a+2) & e(-a+1) & & e(-b+3) & e(-b+2) \\ \vdots & & & \vdots & \vdots \\ e(-1) & e(-2) & & & \\ e(-p) & e(-1) & & & \\ e(-p+1) & e(-p) & & & \\ \vdots & \vdots & & e(-b+k-1) & e(-b+k-2) \\ & & & e(-b+k) & e(-b+k-1) \\ e(-p+k-a-1) & e(-p+k-a) & & & \end{bmatrix}$$

SPEECH CODING SYSTEM UTILIZING A RECURSIVE COMPUTATION TECHNIQUE FOR IMPROVEMENT IN PROCESSING SPEED

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a vector quantization system made available for compression and transmission of data of digital signals such as a speech signal for example. More particularly, the invention relates to a speech coding system using a vector quantization process for quantizing a vector by splitting the vector into data related to gain and index.

2. Description of the Related Art

Today, the vector quantization system is one of the most important technologies attracting keen attention of those concerned, which is substantially a means for effectively encoding either a speech signal or an image signal by effectively compressing it. In particular, in the speech coding field, either the "code excited linear production (CELP)" system or the "vector excited coding (VXC)" system is known as the one to which the vector quantization system is applied. Further detail of the CELP system is described by M. R. Schroeder and B. S. Atal, in the technical papers cited below. "Code excited linear production (CELP)" AND "High-quality speech at very low bit rates", in Proc., ICASSP, 1985, on pages 937 through 939.

The conventional method of vector quantization is described below. The conventional vector quantization process is hereinafter sequentially described by applying a code vector or a vector n1=($u_i$(1), $u_i$(2), . . . $u_i$(L)) (i=1, 2, . . . Ns) generated from a code vector against a target vector u=(u(1), u(2), . . . u(L) composed of L pieces of sample and also by applying NG pieces of gain quantization values Gq (q=1,2 . . . , NG) stored in gain table TG.

Next, using index I and gain code Q of the finally selected code vector based on the above vector quantization, the quantized vector of the target vector u is expressed by equation (B1) shown below.

$$u=G_Q.U_I \tag{B1}$$

Next, based on a conventional vector quantization process, a method of selecting index I and gain code Q is described below.

FIG. 15 presents a schematic block diagram of a conventional vector quantization unit based on the the CELP system. Code book 50 is substantially a memory storing a plurality of code vectors. When the stored code vector C(i) is delivered to a filter 52, vector u(i) is generated. Using the vector u(i) generated by the filter 52 and the target vector u, the vector quantization unit 54 selects an optimal index I and gain code G so that error can be minimized.

An error E Between the target vector u and the prospective vector for making up the quantized vector is expressed by equation (B2) shown below.

$$E_{tq} = \sum_{n=1}^{L} [u(n) - G_q \cdot u_i(n)]^2 \tag{B2}$$

$$i = 1, 2, \ldots, N_s;$$

When solving the above equation (B2), it is suggested that the optimal values of i and q can be selected with minimum error by detecting a combination of these values i and q when the error E is minimum subsequent to the detection of error E from all the combinations of i and q. Nevertheless, since this method detects minimum error E, computation of the above equation (B2) and comparative computations must be executed by $N_S \times N_G$ rounds. Although depending on the values of $N_S$ and $N_G$, normally, a huge amount of computations must be executed. To compensate for this, conventionally, the following method is made available. The above equation (B2) is rewritten into the following equation (B3).

$$E_i = \sum_{n=1}^{L} [u(n) - G_i u_i(n)]^2 \tag{3B}$$

$$i = 1, 2, \ldots, N_S;$$

where G1 designates an optical gain for minimizing the value of $E_i$ in the above equation (B3) against each index i. The value of G1 can be determined by assuming that both sides of the above equation (B3) are equal to zero by partially differentiating both sides with $G_i$.

Concretely, the following equation (B4) can be solved by applying Gi so that still further equations (B5), (B6), and (B7) can be set up. Furthermore, by permuting the above equations (B6) and (B7), the equation (B5) can be developed into (B8).

$$\frac{\partial E_i}{\partial G_i} = -2\sum_{n=1}^{L} [u(n) - G_i u_i(n)]u_i(n) = 0 \tag{B4}$$

$$G_I = \frac{\sum_{n=1}^{L} u(n)u_i(n)}{\sum_{n=1}^{L} [u_i(n)]^2} \tag{B5}$$

$$A_i = \sum_{n=1}^{L} u(n)u_i(n) \tag{B6}$$

$$B_i = \sum_{n=1}^{L} [u_i(n)]^2 \tag{B7}$$

$$G_i = \frac{A_i}{B_i} \tag{B8}$$

By substituting the above equation (B8) into the preceding equation (B3), the following equation (B9) can be set up.

$$E_i = \sum_{n=1}^{L} [u(n)]^2 - \frac{A_i^2}{B_i} \tag{B9}$$

As a result, when the optimal gain $G_i$ is available, the optimal index capable of minimizing the error Ei is substantially the index which minimizes $[A_i]^2/B_i$. Based on this principle, any conventional vector quantization system initially selects index I capable of minimizing the value $[A_i]^2/B_i$ from all the prospective indexes, and then selects the quantized value of the optimal gain $G_i$ (which is to be computed based on the above equation (B8) for the established index I) from the gain quantizing values Gq (q=1, 2, . . . , $N_G$) before eventually determining the gain code Q. This makes up a feature of the conventional vector quantization process.

This conventional system dispenses with the need of directly computing error $E_i$, and yet, makes it possible to select the index I and the gain Q according to the number of computations which is dependent on the number of the prospective indexes dispensing with computation of all the combinations of i and q.

FIG. 16 presents a flowchart designating the procedure of the computation mentioned above. Step 31 shown in FIG. 16 computes power $B_i$ of vector $u_i$generated from the prospective index i by applying the above equation (B7), and also computes an inner product A; of the vector $u_i$ and the target vector u by applying the above equation (B6).

Step 32 determines the index I maximizing the assessed value $[A_i]^2/B_i$ by applying the power $B_i$ and the inner product $A_i$, and then holds the selected index value.

Step 33 quantizes gain using the power $B_i$ and the inner product $A_i$ based on the quantization output index determined by the process shown in the preceding step 32.

To compare the indexes i and j in the course of the above step 32, it is known that the following equation (B10) can be used for executing comparative computations without applying division.

$$\Delta_{ij}=[A_i]^2\cdot B_j-[A_j]^2\cdot B_i \tag{B10}$$

In the above equation (B10), if Δij were positive, then the index i is selected. Conversely, if Δij were negative, then the index j is selected.

After completing comparison of the predetermined number of indexes, the ultimate index is selected, which is called the "quantization output index".

The conventional system related to the vector quantization described above can select indexes and gains by executing relatively lower number of computations. Nevertheless, any of these conventional systems has a particular problem in the performance of quantization. More particularly, since the conventional system assumes that no error is present in the quantized gain when selecting an index, in the event that there is substantial error in the quantized gain later on, the error E(i,q) of the above equation B2 expands beyond a negligible range. This is described below in detail.

While executing those processes shown in FIG. 16, it is assumed that the index I is established after completing executing of step 32. It is also assumed that quantization of an optimal gain $G_i$ of the index I is completed by executing computations as per the preceding equation (B8) in step 33, and then the quantized value $G_I$ is entered. The error δ of the quantized gain can be expressed by the following equation (B11).

$$\delta=G_I-G_I \tag{B11}$$

In this case, the error $E_I$ between the target vector and the quantized vector yielded by applying the index I and the quantized gain $G_I$ can be expressed by the following equation (B12) by substituting the preceding equations (B6) through (B8) and (B11) into the preceding equation (B3).

$$E_I=\sum_{n=1}^{L}[u(n)]^2-\frac{A_I^2}{B_I}+\delta^2 B_I \tag{B12}$$

The right side of the above equation (B12) designates the overall error of the gain quantization when taking the error δ of the quantized gain into consideration.

The conventional system selects the index I in order to maximize only the value of $A_I^2/B_I$ in the second term of the right side of the above equation (B12) without considering the influence of the error δ of the quantized gain on the overall error of the quantized vector. As a result, when there is substantial error of the quantized gain, in other words, when the value of the optimal gain GI is apart from the value of the preliminarily prepared gain table, the value of $\delta^2 B_I$ can grow beyond the negligible range in the actual quantization process.

If this occurs, since the overall error of the quantized vector is extremely large, any conventional vector quantization process cannot provide quantization of stable vectors at all.

As just mentioned above, any conventional vector quantization system selects indexes without considering adverse influence of the error of the quantized gain on the overall error of the quantized vector. Consequently, when the error grows itself beyond the negligible range after execution of subsequent quantization of the gain, overall error of the quantized vector significantly grows. As a result, any conventional system cannot provide quantization of stable vectors.

The following description refers to a conventional CELP system mentioned earlier.

FIG. 7 presents the principle structure of a conventional CELP system. In FIG. 7, first, a speech signal is received from an input terminal 1, and then block-segmenting section 2 prepares L units of sample values on a per frame basis, and then these sample values are output from an output port 3 as speech signal vectors having length L. Next, these speech signal vectors are delivered to an LPC analyzer 4. Based on the "auto correlation method", the LPC analyzer 4 analyzes the received speech signal according to the LPC method in order to extract LPC forecast parameter (ai) (i=1, . . . , p). P designates the prediction order. The LPC forecast residual vector is output from an output port 18 for delivery to the ensuing pitch analyzer 21. Using the LPC forecast residual vector, the pitch analyzer 21 analyzes the pitch which is substantially the long-term forecast of speech, and then extracts "pitch period" TP and "gain parameter" b. These LPC forecast parameters, "pitch period" and gain parameter extracted by the pitch analyzer are respectively utilized when generating synthesis speech by applying an LPC synthesis filter 14 and a pitch synthesizing filter 23.

Next, the process for generating speech is described below. The codebook 17 shown in FIG. 7 contains n units of white noise vector of K units of a dimensional number (the number of vector elements), where K is selected so that L/K is an integer. The j-th white noise vector of the codebook 17 is multiplied by the gain parameter 22, and then the product is filtered through the pitch synthesizing filter 23 and the LPC synthesis filter 14. As a result, the synthesis speech vector is output from an output port 24. The transfer function P(Z) of the pitch synthesizing filter 23 and the transfer function A(Z) of the LPC synthesis filter 14 are respectively formulated into the following equations (1) and (2).

$$A(Z) = 1 \Big/ \left(1 + \sum_{i=1}^{P} a_i Z^{-i}\right) \quad (1)$$

$$P(Z) = 1/(1 + bZ^{-TP}) \quad (2)$$

The generated synthesis speech vector is delivered to the square error calculator 19 to gather with the target vector composed of the input speech vector. The square error calculator 19 calculates the Euclidean distance $E_j$ between the synthesis speech vector and the input speech vector. The minimum error detector 20 detects the minimum value of $E_j$. Identical processes are executed for n units of white noise vectors, and as a result, a number "j" of the white noise vector providing the minimum value is selected. In other words, the CELP system is characterized by quantizing vectors by applying the codebook to the signal driving the synthesis filter in the course of synthesizing speech. Since the input speech vector has length L, the speech synthesizing process is repeated by L/K rounds. The weighting filter 5 shown in FIG. 7 is available for diminishing distortion perceivable by human ears by forming a spectrum of the error signal. The transfer function is formulated into the following equations (3) and (4).

$$W(Z) = \frac{H(Z/\gamma)}{H(Z)} \quad (3)$$

$$H(Z) = A(Z) \cdot P(Z) \quad (4)$$

When the CELP system is actually made available for the encoder itself, those LPC forecast parameters, pitch period, gain parameter of the pitch, codebook number, and the codebook gain, are fully encoded before being delivered to the decoder.

FIG. 8 illustrates the functional block diagram of a conventional CELP system apparatus performing those functional operations identical to those of the apparatus shown in FIG. 7. Compared to the position in the loop available for detecting a conventional codebook, the weighting filter 5 shown in FIG. 8 is installed to an outer position. Based on this structure, P(Z) of the pitch synthesizing filter 23 and A(Z) of the LPC synthesis filter 14 can respectively be expressed to be $P(Z/\gamma)$ and $A(Z/\gamma)$. It is thus clear that the weighting filter 5 can diminish the amount of calculation while preserving the identical function.

It is so arranged that the initial memory available for the filtering operation of the pitch synthesizing filter 23 and the LPC synthesis filter 14 does not affect detection of the codebook relative to the generation of synthesis speech. Concretely, another pitch synthesizing filter 25 and another LPC synthesis filter 7 each containing an initial value of memory are provided, which respectively subtract a "zero-input vector" delivered to an output port 8 from a weighted input speech vector preliminarily output from an output port 6 so that the resultant value from the subtraction can be made available for the target vector. As a result, the initial values of memories of the pitch synthesizing filter 23 and the LPC synthesis filter 14 can be reduced to zero. At the same time, it is possible for this system to express generation of synthesis speech, in other words, filter operation of such synthesis filters receiving the codebook in terms of the code vector and the product of the trigonometric matrix shown below.

$$H = \begin{bmatrix} h(1) \\ h(2)h(1) \\ h(3)h(2)h(1) \\ \vdots \\ h(1) \\ \vdots \\ h(k) \ldots h(2)h(1) \end{bmatrix}$$

A small character "K" shown in the above equation (5) designates a dimensional number (number of elements) of the code vector of the codebook 17. "h(i) i=1, . . . , K" designates impulse response of the length K when the initial value of memory of $H(Z/\gamma)$ is zero.

Next, the square error calculator 19 calculates error Ej from the following equation (6), and then the minimal distortion detector 20 calculates the minimal value (distortion value).

$$E_j \| X - \gamma_j H C_j \| (J=1, 2, \ldots n) \quad (6)$$

where X designates the target input vector, $C_j$ the j-th code vector, and $\gamma_j$ designates the optimal gain parameter against the j-th code vector, respectively.

FIG. 9 represents a flowchart designating the procedure in which the value $E_j$ is initially calculated and the vector number "j" giving the minimum value of $E_j$ is calculated. To execute this procedure, first, the value of $HC_j$ must be calculated for each "j" by applying multiplication by K(K+1)/2·n rounds. When K=40 and n=1024 according to conventional practice, as many as 839,680 rounds of multiplication must be executed. Assuming L/K=4 in the total flow of computation, then as many as 1,048,736 rounds per frame of multiplication must be executed. In other words, when using L=160 for the number of samples L per frame and 8 KHz for the sampling frequency of input speech, as many as $52 \times 10^6$ rounds per second of multiplication must be executed. To satisfy this requirement, at least three digital signal processors each having 20 MIPS of multiplication capacity are needed.

To improve the speech quality of the CELP system, such a system called "formation of closed loop for pitch forecast" or "compatible code book" is conventionally known. Details of this system are described by W. B. Kleijin, D. J. Krasinski, and R. H. Ketchum, in the publication "Improved Speech Quality and Efficient Vector Quatization in CELP", in Proc., ICASSP, 1988, on pages 155 through 158.

Next, referring to FIG. 10, the CELP system called either "formation of closed loop for pitch forecast" or "compatible code book" is briefly explained below.

FIG. 10 is a schematic block diagram designating a principle of the structure. Only the method of analyzing the pitch makes up the difference between the CELP system based on either the above "formation of closed loop for pitch forecast" or the "compatible code book" and the CELP system shown in FIG. 7. When analyzing the pitch according to the CELP system shown in FIG. 7, pitch is analyzed based on the LPC forecast residual signal vector output from the output port 18 of the LPC analyzer. On the other hand, the CELP system shown in FIG. 10 features the formation of a closed loop for analyzing pitch like the case of detecting the code book. When operating the CELP system shown in FIG. 10, the LPC synthesis filter drive signal output from the output 18 of the LPC analyzer goes through a delay unit 13 which is variable throughout the pitch detecting range and generates drive signal vectors corresponding to the pitch period "j". The drive signal vector is assumed to be stored in a compatible codebook 12. Target vector is composed of the weighted input vector free from the influence of the preceding frames. The pitch period is detected in order that the error between the target vector and the synthesis signal vector can be minimized. Simultaneously, an estimating unit 26 applying square-distance distortion computes error Ej as per the equation (7) shown below.

$$E_j \| X - \gamma_j HB_j \| (a \leq j \leq b) \quad (7)$$

where X designates the target vector, Bj the drive signal vector when the pitch period "j" is present, $\gamma_j$ the optimal gain parameter against the pitch period "j", H is given by the preceding equation (5), and "H(i) i=1, . . . , K" designates impulse response of the length K when the initial value of memory of A(Z/γ) is zero, respectively. The symbol "t" shown in FIG. 11 designates the number of sub-frame composed by the input process. When executing this process, the value of HBj must be computed for each "t" and "j". The CELP System shown in FIG. 11 needs to execute multiplication by $K(K+1)/2\cdot(b-a+1)\cdot L/K$ rounds. Furthermore, when K=40, L=160, a=20, and b=147 in the conventional practice, the CELP system is required to execute multiplication by 461,312 rounds. Accordingly, when using 8 KHz of input-speech sampling frequency, the CELP system needs to execute as many as $23\times10^6$ rounds per second of multiplication. This in turn requires at least two units of DSP (digital signal processor) each having 20 MIPS of multiplication capacity.

As is clear from the above description, when detecting pitch period by applying "detection of code book" and "closed loop or compatible code book" under the conventional CELP system, a huge amount of multiplication is needed, thus raising a critical problem when executing real-time data processing operations with a digital signal processor DSP.

SUMMARY OF THE INVENTION

The object of the invention is to provide a speech coding system which is capable of fully solving those problems mentioned above by minimizing the amount of computation to a certain level at which real-time data processing operation can securely be executed with a digital signal processor.

The second object of the invention is to provide a vector quantization system which is capable of securely quantizing stable and high quality vectors notwithstanding the procedure of quantizing the gain after selecting an optimal index.

The invention provides a novel speech coding system which recursively executes a filter-applied "Toeplitz characteristic" by causing a drive signal, i.e. excitation signal to be converted into the "Toeplitz matrix" when detecting a pitch period in which distortion of the input vector and the vector subsequent to the application of filter-applied computation to the drive signal vector in the pitch forecast called either "closed loop" or "compatible code book" is minimized.

The vector quantization system substantially making up the speech coding system of the invention characteristically uses a vector quantization system comprising a means for generating the power of a vector from the prospective indexes; a means for computing the inner product values of the vector power and a target vector; a means for limiting the prospective indexes based on the inner product value of the power of vector and the critical value of the preliminarily set code vector; a means for selecting a quantized output index by applying the vector power and the linear product value based on the limited prospective indices; and a means for quantizing the gain by applying the vector power and the inner product value based on the selected index.

When executing the pitch-forecasting process called "closed loop" or "compatible code book", the invention converts the drive signal matrix into "toeplitz matrix" to utilize the "Toeplitz characteristic" so that the filter-applied computation can recursively be accelerated, thus making it possible to sharply decrease the required rounds, i.e., number of time of multiplication.

The second function of the invention is to cause the speech coding system to identify whether the optimal gain exceeds the critical value or not by applying the vector power generated from the prospective index, the inner product value of the target vector, and the critical value of the gain of the preliminarily set vector. Based on the result of this judgment, the speech coding system specifies the prospective indexes, and then selects an optimal index by eliminating such prospective indexes containing a substantial error of the quantized gain. As a result, even when quantizing the gain after selecting an optimal index, stable and high quality vector quantization can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
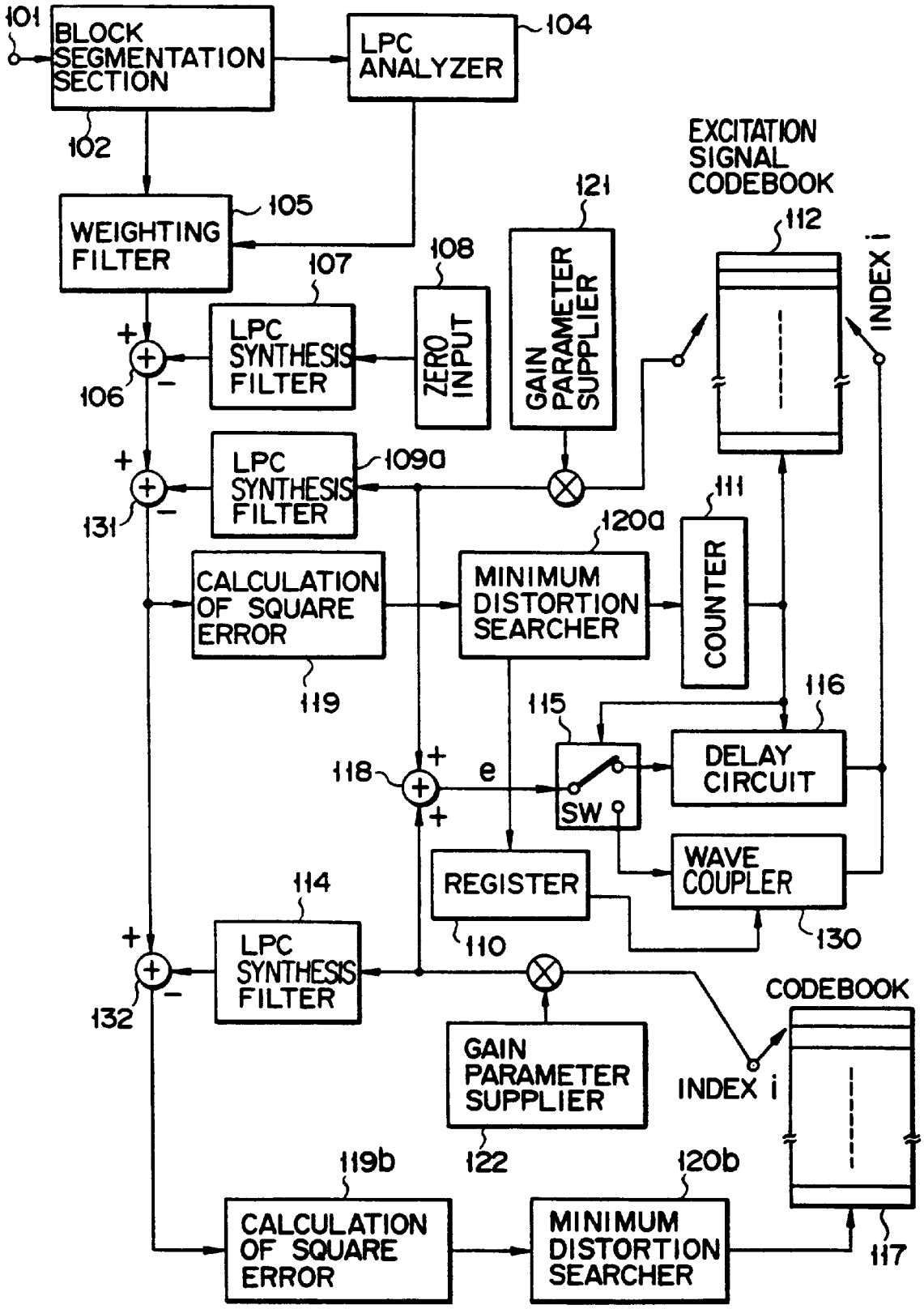
FIG. 1 is a schematic block diagram designating principle of the structure of the speech coding system applying the pitch parameter detection system according to an embodiment of the invention.

Referring to FIG. 1, a line of speech signals are delivered from an input terminal 101 to a block segmenting section 102, which then generates L units of sample values and puts them together as a frame and then outputs these sample values as input signal speech vectors having length L for delivery to an LPC analyzer 104 and a weighting filter 105. Applying the "autocorrelation method" for example, the LPC analyzer 104 analyzes the received speech signal according to the longitudinal parity checking before extracting an LPC forecast parameter ($a_i$) (i=1, . . . , P). The character P designates the prediction order. The extracted LPC forecast parameter is made available for those LPC synthesis filters 107, 109, and 114. In order to execute weighting of the input signal vector, the weighting filter 105 is set to a position outer from the original code-book detecting and pitch-period detecting loop so that the weighting can be executed by the LPC forecast parameter extracted from the LPC analyzer 104.

By converting A(Z) into (Z/7) in the LPC synthesis filters 107, 109, and 114, the amount of the needed computation can be decreased by forming a spectrum of an error signal while preserving function to diminish distortion perceivable by human ears. The transfer function W(Z) of the weighting filter 105 is given by the equation (8) shown below.

$$W(Z)=A(Z/\gamma)/A(Z)\ (0\leqq\gamma\leqq1) \tag{8}$$

A (Z) of the above equation (8) is expressed by equation (9).

$$A(Z) = 1\Big/\left(1+\sum_{i=1}^{P} a_i Z^{-i}\right) \tag{9}$$

It is so arranged in the speech coding system of the invention that the initial value of memory cannot affect the detection of the pitch period or the codebook during the generation of synthesis speech while the computation is performed by the LPC synthesis filters 109 and 114. Concretely, another LPC synthesis filter 107 having memory 108 containing the initial value zero is provided for the system, and then, a zero-input response vector is generated from the LPC synthesis filter 107. Then, the zero-input response vector is subtracted from the weighted input speech vector preliminarily output from an adder 106 in order to reset the initial value of the LPC synthesis filter 107 to zero. At the same time, by allowing the LPC synthesis filter receiving the drive signal vector to execute computation for detecting the pitch period or another LPC synthesis filter receiving the code vector to also execute computation for detecting the codebook, the speech coding system of the invention can express the filtering by the product of the drive signal vector or the code vector and the trigonometric matrix by the following K×K matrix.

$$H=\begin{bmatrix} h(1) & & \\ h(2) & h(1) & \\ h(3) & h(2) & h(1) \\ \vdots & & h(1) \\ h(k) & \dots & h(2)\ h(1) \end{bmatrix} \tag{10}$$

The character "K" shown in the above equation (10) designates the dimensional number (number of elements) of the drive signal vector and the code vector. Generally, "K" is selected so that L/K is an integer. "j(i), i=1, . . . , K designates the impulse response having length "K" when the initial value of memory of A (Z/γ) is zero.

When the pitch period detection is entered, first, a drive signal "e" for driving the LPC synthesis filters output from the adder 118 is delivered to a switch 115. If the pitch period "j" as the target of the detection has a value more than the dimensional number K of the code vector, the drive signal "e" is then delivered to a delay circuit 116. Conversely, if the target pitch period "j" were less than the dimensional number K, the drive signal "e" is delivered to a waveform coupler 130, and as a result, a drive signal vector against the pitch period "j" is prepared covering the pitch-detecting range "a" through "b".

Figure 2:
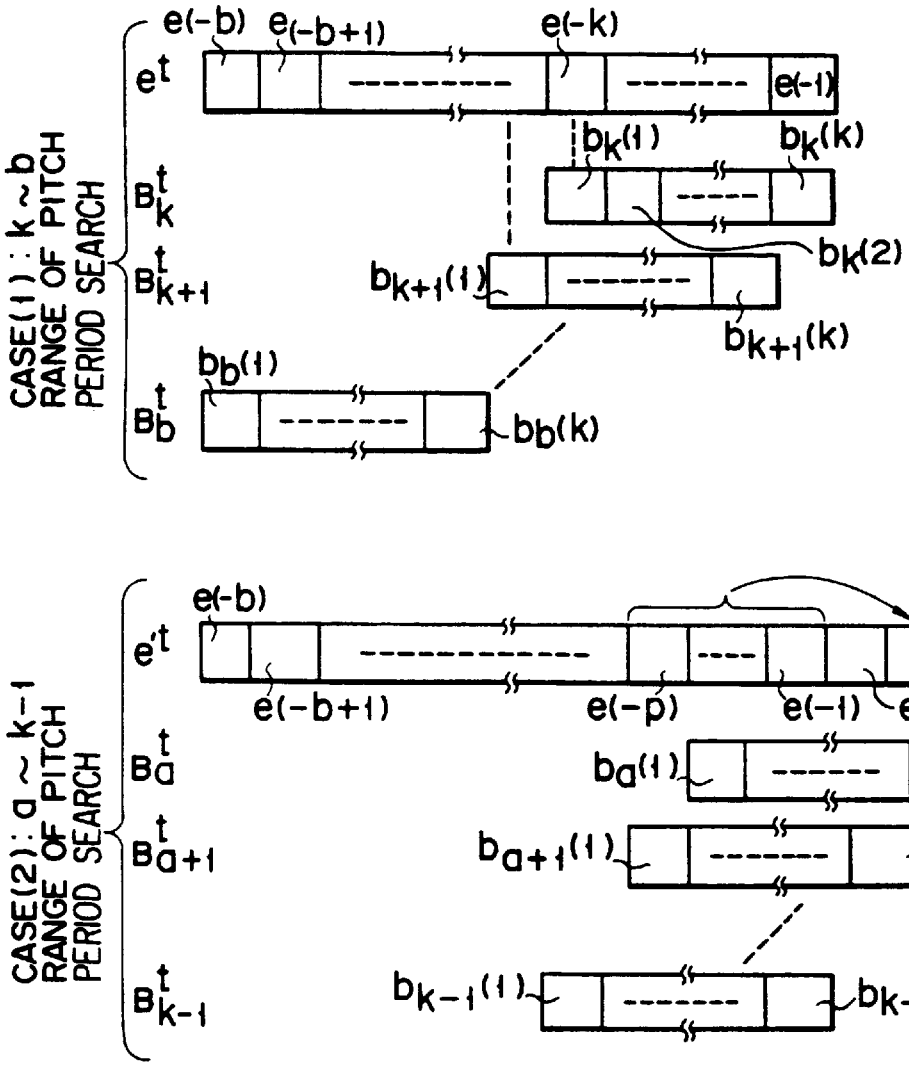
FIG. 2 is a chart designating vector matrix explanatory of an embodiment of the invention.

Next, a counter 111 increments the pitch period all over the pitch detecting range "a" through "b", and then outputs the incremented values to a drive signal code-book 112, switch 115 and the delay circuit 116, respectively. If the pitch period "j" were in excess of the dimensional number "K", as shown in FIG. 2—2, drive signal vector $B_j$ is generated from a previous drive signal "e" yielded by the delay circuit 116. These are composed of the following equations (11) and (12).

$$e=(e(-b),\ e(-b+1),\ \dots,\ e(-1))^t \tag{11}$$

$$B_j=(b_j(1),\ b_j(2),\ \dots,\ b_j(k))^t=(e(-j),\ e(-j+1),\ \dots,\ e(-j+k-1)^t\ (j=k,\ k+1,\ \dots,\ b) \tag{12}$$

The symbol $B_j$ designates the drive signal vector when the pitch period "j" is present. The character "t" designates transposition. If the pitch period "j" were less than the dimensional number "K", the system combines a previous drive signal (e(−p), e(−p+1), . . . , e(−1)) used for the pitch period "P" of the last sub-frame stored in register 110 with the corresponding previous drive signal "e" to rename the combined unit as e', and then, a new drive signal vector is generated from the combined unit e'. This is formulated by the equation (13) shown below.

$$B_j=(e(-j),\ e(-j+1),\ \dots,\ e(-1)e(-P)e(-P+1)\ \dots,\ e(-P+K-j-1)^t\ (j=a,\ a+1,\ \dots,\ K-1) \tag{13}$$

According to the equation (13), when expressing each component of the drive signal vector $B_j$ by way of ($b_j$(1), $b_j$(2), . . . , $b_j$(k)), these can in turn be expressed by the function by way of $b_j(m)=b_{j-1}(m-1)$ $(a-1\leqq j\leqq b,\ 2\leqq m\leqq k)$. It is also possible for the system to express the drive-signal matrix B making up the matrix vector with the drive signal vector $B_j$ in terms of a perfect Toeplitz matrix shown in the following equation (14).

$$B=(B_a,\ B_{a+1},\ \dots,\ B_b)= \tag{14}$$

-continued $$\begin{bmatrix} e(-a) & e(-a-1) & e(-b+1)\,e(-b) \\ e(-a+1) & e(-a) & e(-b+2)\,e(-b+1) \\ e(-a+2) & e(-a+1) & e(-b+3)\,e(-b+2) \\ e(-1) & e(-2) & \\ e(-P) & e(-1) & \\ e(-P+1) & e(-P) & \\ & & e(-a)\,e(-a-1) \\ e(-P+K-a-1) & e(-P-K-a) & e(-a+1)\,e(-a) \end{bmatrix}$$

According to the invention, the pitch period capable of minimizing error is sought by applying the target vector composed of a weighted speech input vector free from influence of the last frame output from the adder 106. Distortion $E_i$ arising from the squared distance of the error is calculated by applying the equation (15) shown below.

$$E_j=\|X_t-\gamma_j HB_j\|(a\leqq j\leqq b) \tag{15}$$

The symbol $X_t$ designates the target vector, $B_j$ the drive signal vector when the pitch period "j" is present, $\gamma_j$ the optimal gain parameter for the pitch period "j", and H is given by the preceding equation (10).

When computing the above equation (15), computation of $HB_i$, in other words, the filtering operation can recursively be executed by utilizing those characteristics that the drive signal matrix is based on the Toeplitz matrix, and yet, the impulse response matrix of the weighted filter and the LPC synthesis filter is based on downward trigonometric matrix and the Toeplitz matrix as well. This filtering operation can recursively be executed by applying the following equations (16) and (17).

$$V_j(1)=h(1)e(-j) \tag{16}$$

$$V_j(m)=V_{j-1}(m-1)+h(m)e(-j)\ (2\leqq m\leqq K)\ (a+1\leqq j\leqq b) \tag{17}$$

where $(V_i(1), V_i(2), \ldots, V, (K))^t$ designates the element of $HB_i$.

Figure 3:
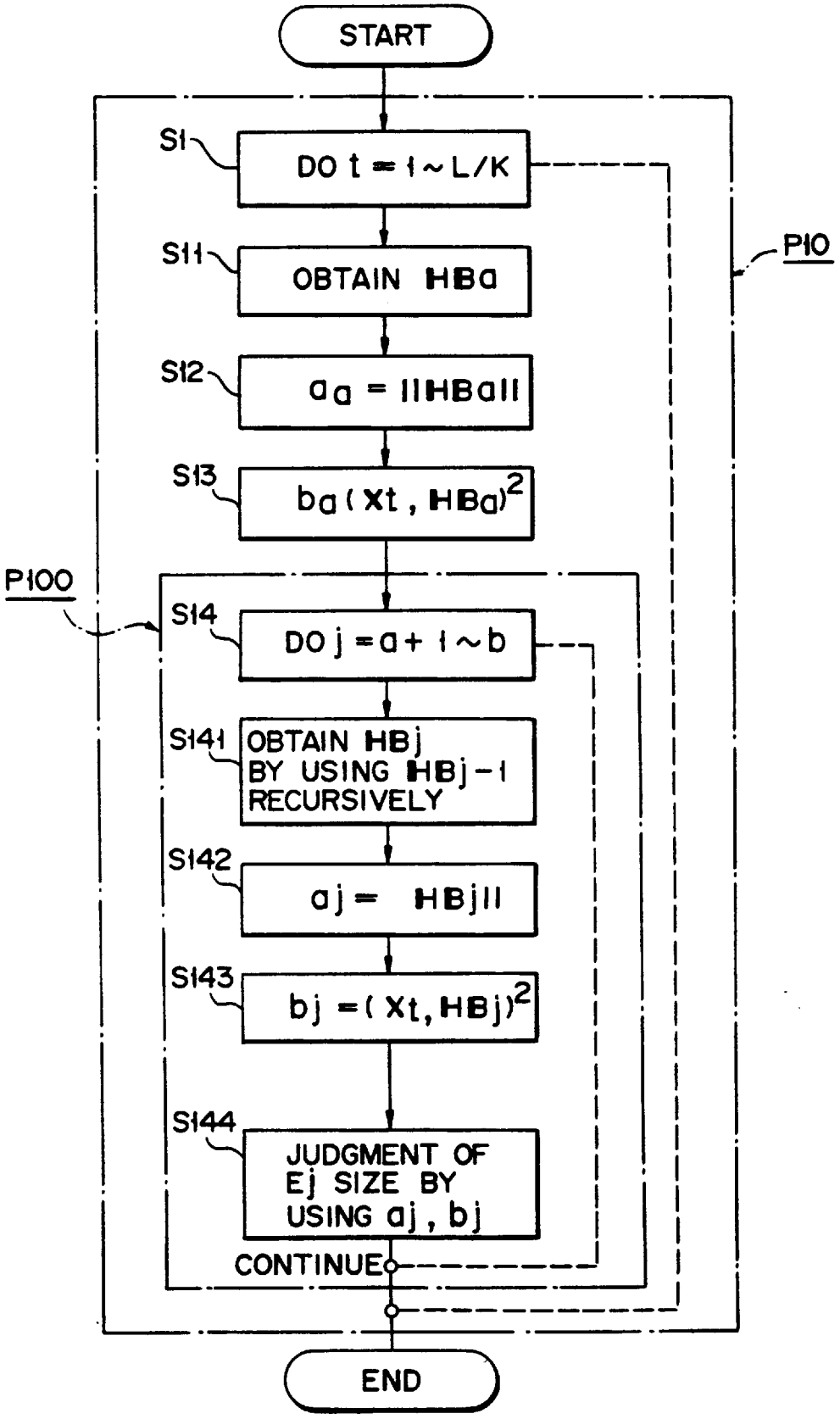
FIG. 3 is a flowchart explanatory of computing means according to an embodiment of the invention.
Figure 9:
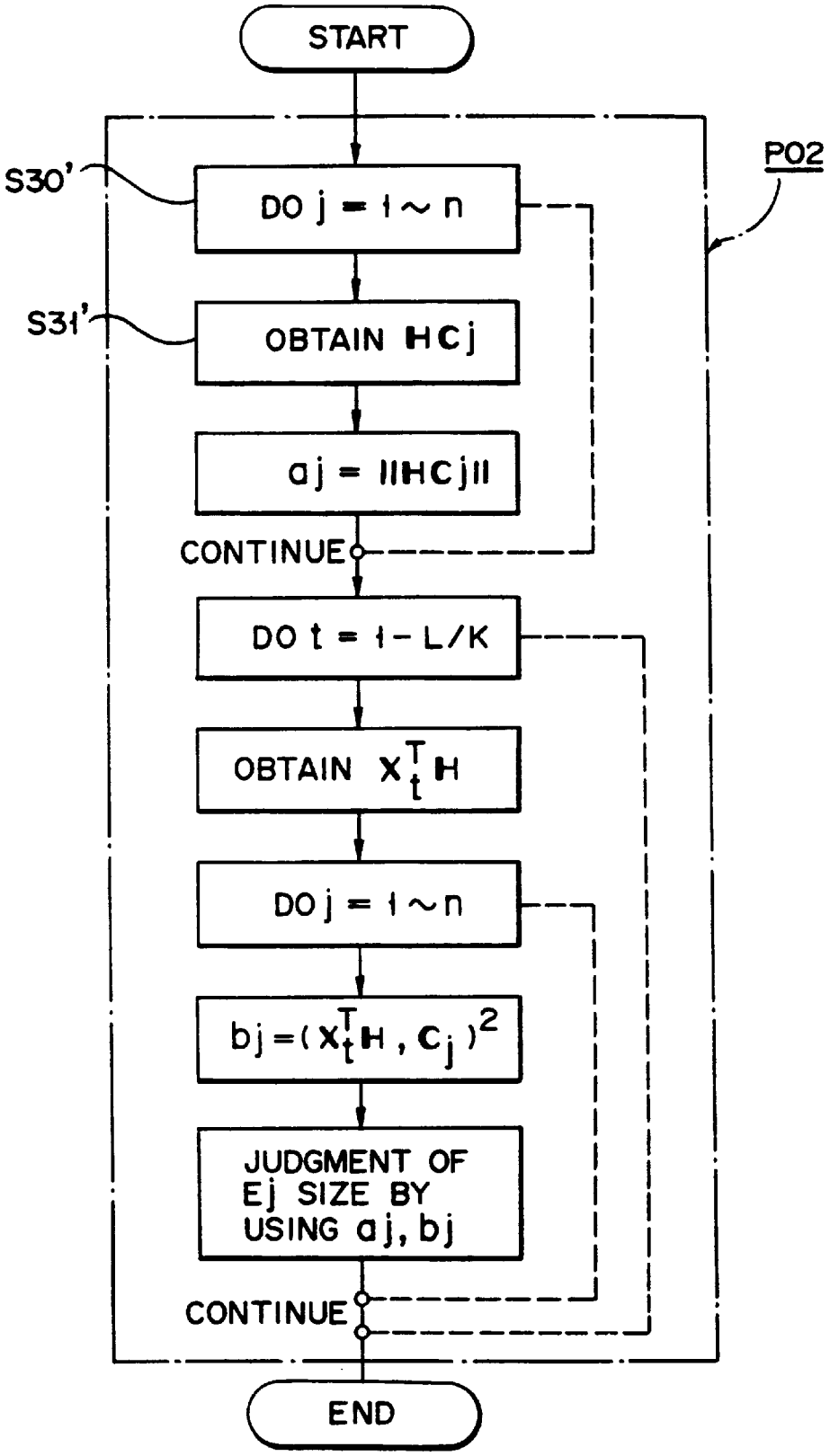
F I G. 9 PRIOR ART
FIG. 9 is a flowchart explanatory of a conventional computing means.
Figure 10:
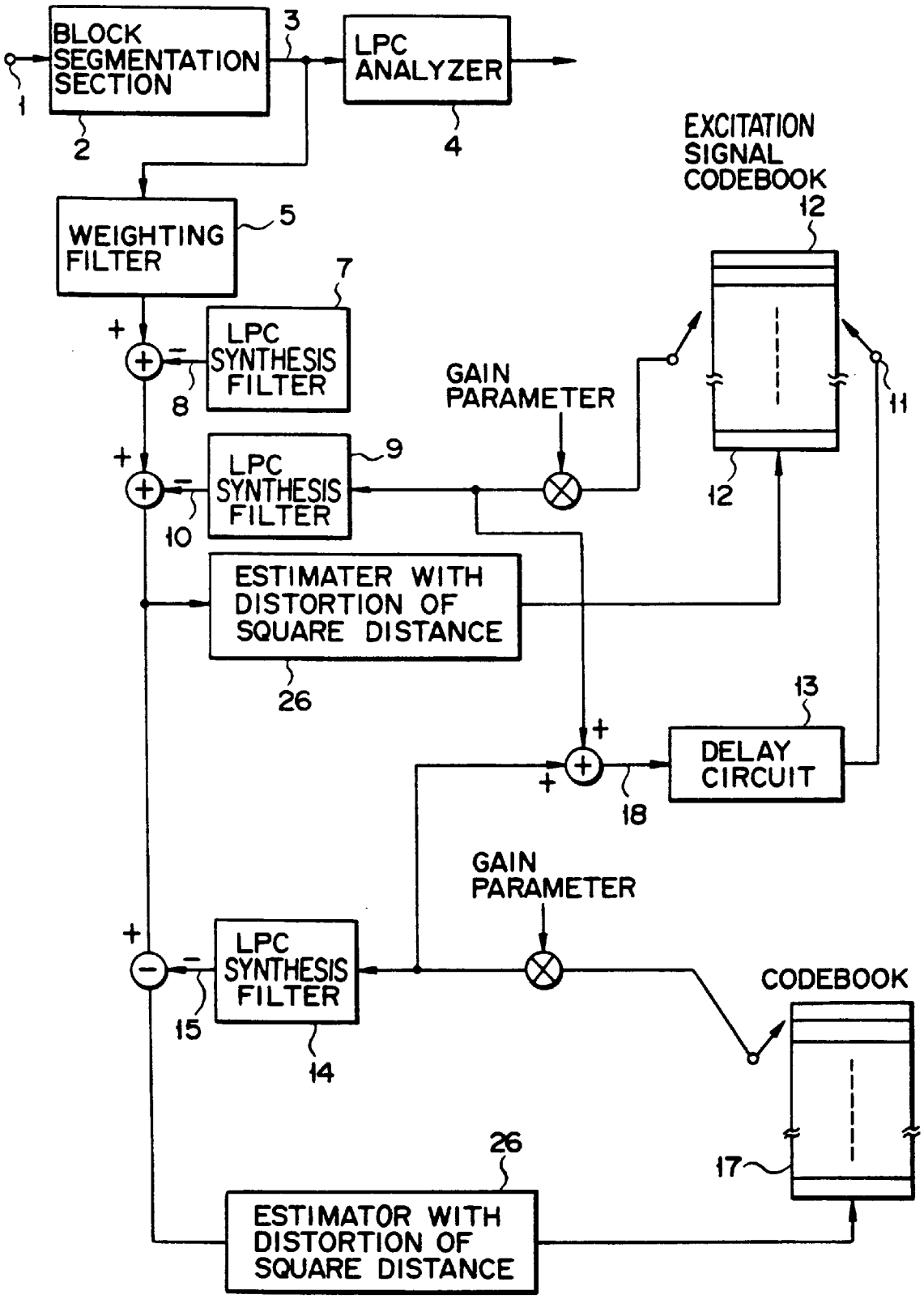
FIGS. 10 and 11 are respectively flowcharts explanatory of conventional computing means.
Figure 11:
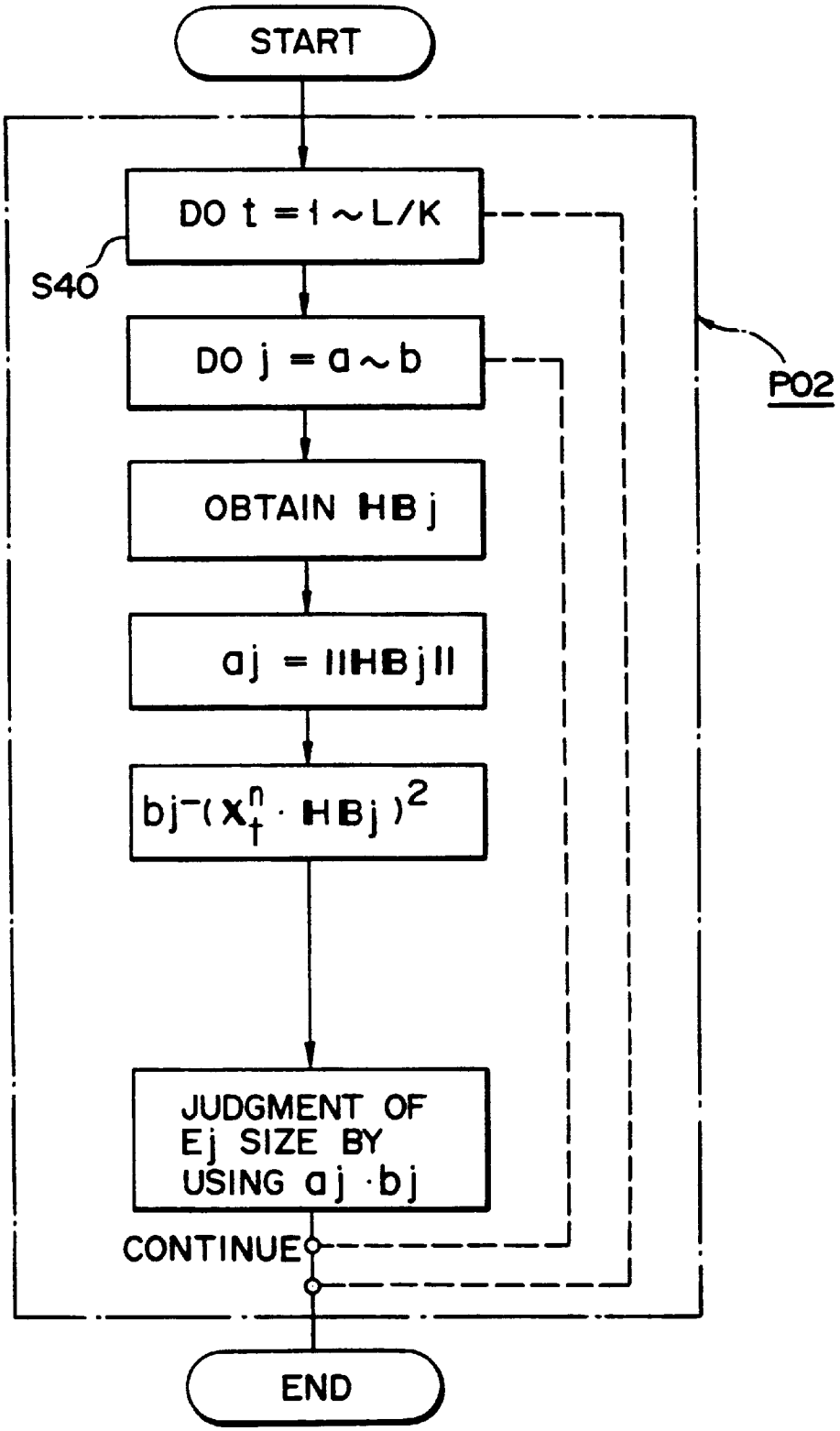
F I G. 11 PRIOR ART

According to the flowchart shown in FIG. 3, only $HB_a$ can be calculated by applying conventional matrix-vector product computation, whereas $HB_j(a+1\leqq j\leqq b)$ can recursively be calculated from $HB_{j-1}$, and in consequence, the number of times of needed multiplication can be reduced to $\{K(K+1)/2+(b-a)\}\cdot L/K$. When k=40, L=160, a=20, and b=147 as per conventional practice, a total of 23,600 rounds of multiplication is executed. A total of 65,072 rounds of multiplication are executed covering the entire flow. This in turn corresponds to about 14% of the rounds of multiplication needed for the conventional system shown in FIG. 9. When applying 8 KHz of the input speech sampling frequency, the rate of multiplication is $3.3\times10^6$ rounds per second.

Gain parameter $\sigma_j$ and the pitch period "j" are respectively computed so that $E_j$ shown in the above equation (15) can be minimized. Concrete methods of computation are described later on.

Referring to FIG. 1, when the optimal pitch period "j" is determined, the synthesis speech vector based on the optimal pitch period "j" output from the LPC synthetic filter 109 is subtracted from the weighted input speech vector (free from the influence of the last frame output from from the adder 106, and then the weighted input speech vector free from the influence of the last frame and the pitch is output.

Next, synthesis speech is generated by means of a code vector of the codebook 117 in reference to the target vector composed of the weighted input speech vector (free from the influence of the last frame and the pitch) output from the adder 131. A code vector number "j" is selected, which minimizes distortion $E_j$ generated by the squared distance of the error. The process of this selection is expressed by the following equation (18).

$$E_j=\|X_t-\sigma_j HC_j\|(1\leqq j\leqq n)\ (1\leqq t\leqq L/K) \tag{18}$$

where X designates the weighted input speech vector free from the influence of the last frame and the pitch, $C_j$ the j-th code vector, $\gamma_j$ the optimal gain parameter against the j-th code vector, and n designates the number of the code vector.

A huge amount of computation is needed to be performed for $E_j$ when $C_j$ is composed of independent white noise, an optimal code number for minimizing the value of $E_j$, and $HC_j$ shown in the above equation (18).

Figure 4:
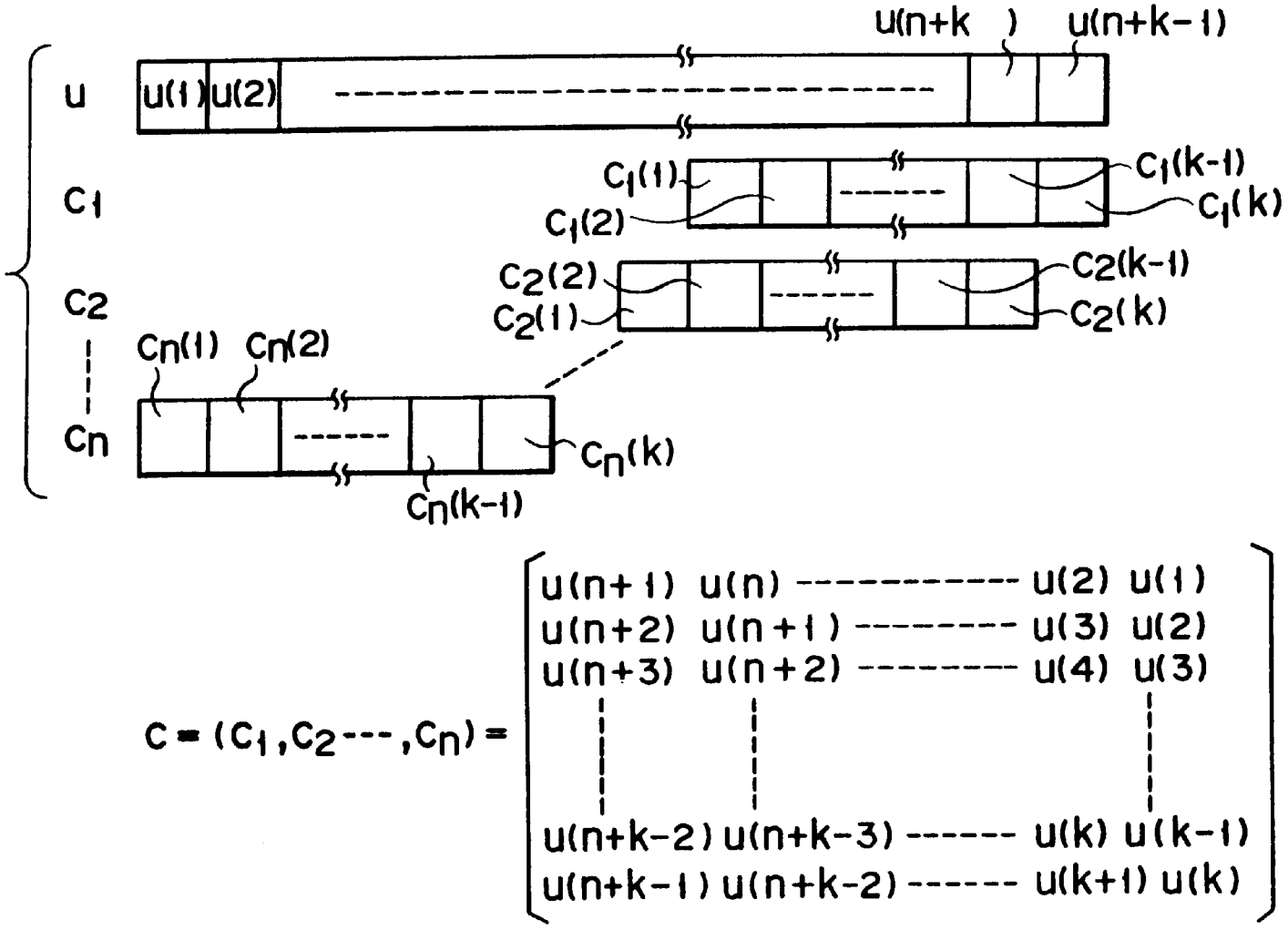
FIG. 4 is a chart designating vector matrix explanatory of an embodiment of the invention.

To decrease the rounds of the needed computation, the speech coding system of the invention shifts $C_j$ by one sample lot from the rear of a white noise matrix u of length n+k=1 and then cuts out a sample having length "k" as shown in FIG. 4. As is clear from FIG. 4, there is a specific relationship expressed by $C_j=\ldots C_{j-1}(m-1)$ $(2\leqq j\leqq n, 2\leqq m\leqq k)$, the code-book matrix composed of code vector $C_j$ aligned in respective vector matrixes is characteristically the Toeplitz matrix itself.

$$W_j(1)=h(1)J(n+1-j)\ (2\leqq m\leqq K)$$

$$W_j(m)=W_{j-1}+h(m)U(n+1-j)\ (2\leqq j\leqq n)$$

When this condition is present in which each element of $HC_j$ is composed of $(W_j(1), W_j(2), \ldots, W(k)^t)$, the following relation is established so that $HC_j$ can recursively be computed.

Figure 5:
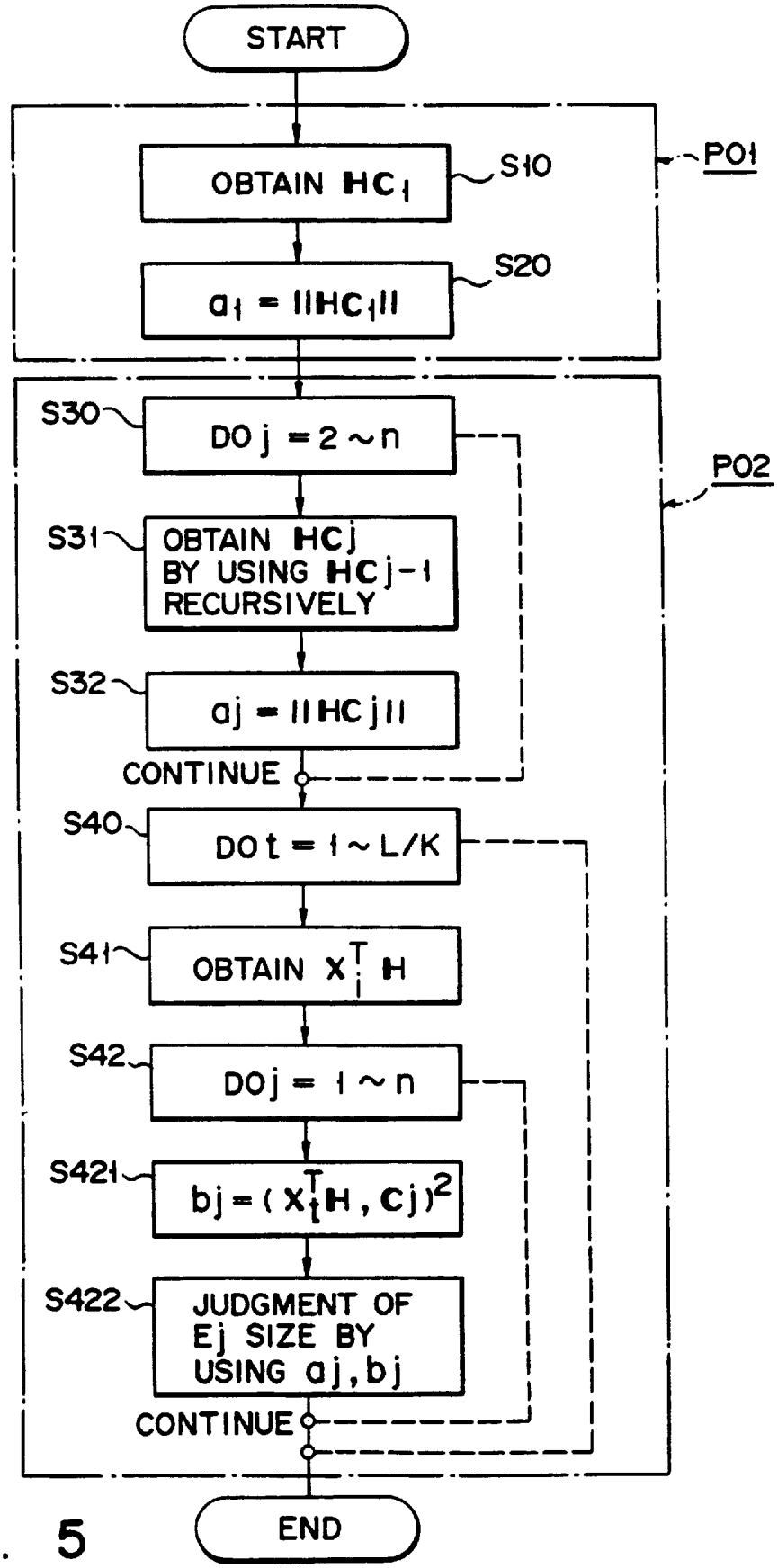
FIG. 5 is another flowchart explanatory of computing means according to an embodiment of the invention.
Figure 8:
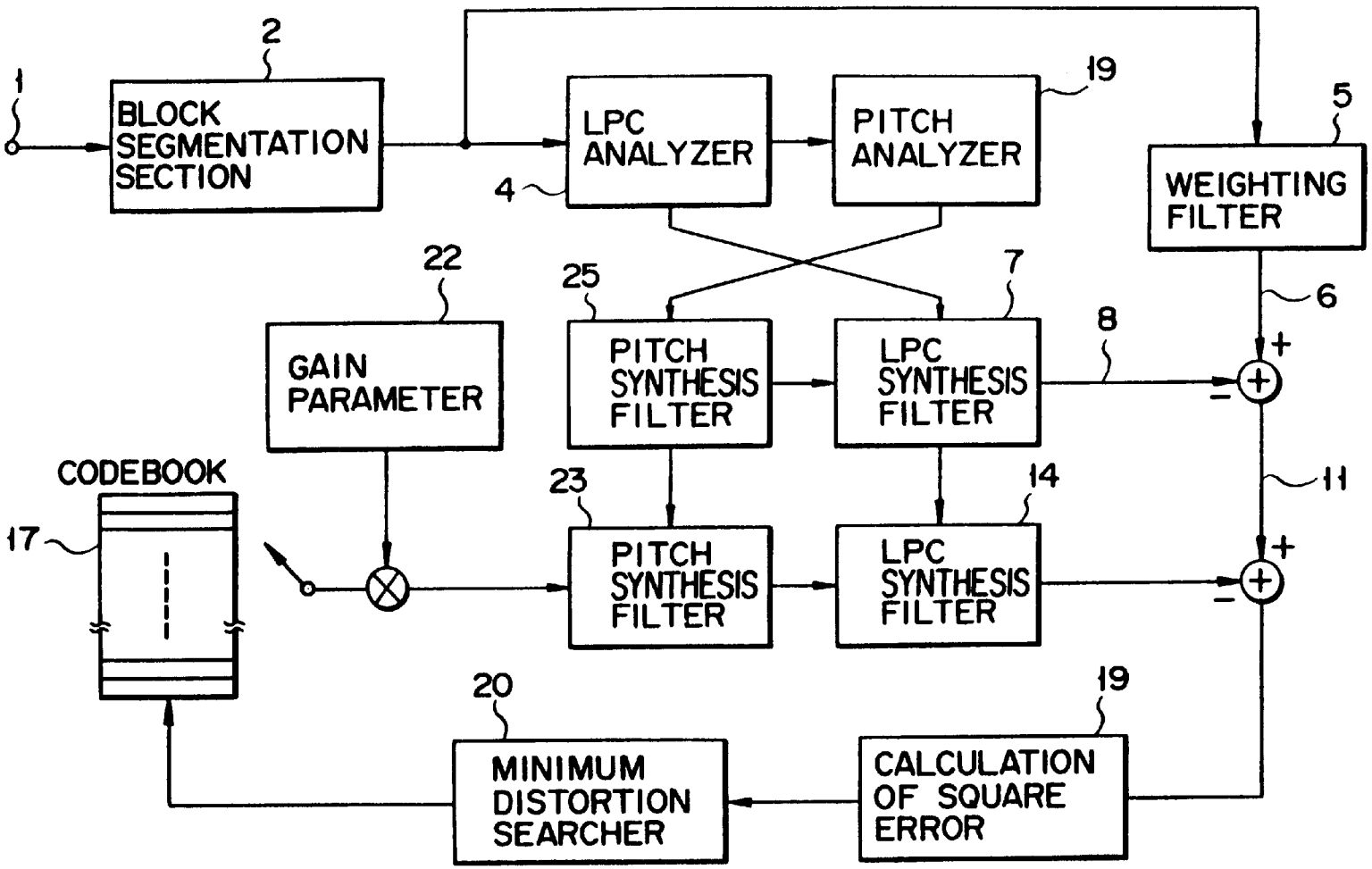
FIG. 8 PRIOR ART
FIG. 8 is a schematic block diagram explanatory of another conventional speech coding system.

According to the flowchart shown in FIG. 5, only HC1 can be calculated by a conventional matrix-vector product computation, whereas $HC_i(2\leqq j\leqq n)$ can recursively be calculated from $HC_{j-}$1. As a result, the round of the needed computation is reduced to $\{K\cdot(K+1)/2+K\cdot(n-1)\}$. When applying K=40 and n=1024 as per the conventional practice, a total of 41,740 rounds of computation are needed. A total of 2,507,964 rounds of computation are performed in the entire flow. This corresponds to 24% of the total rounds of computation based on the system related to the flowchart shown in FIG. 8. In consequence, when applying 8 KHz as the input speech sampling frequency, the speech coding system of the invention merely needs to execute $12.5\times10^6$ rounds per second of multiplication.

Figure 7:
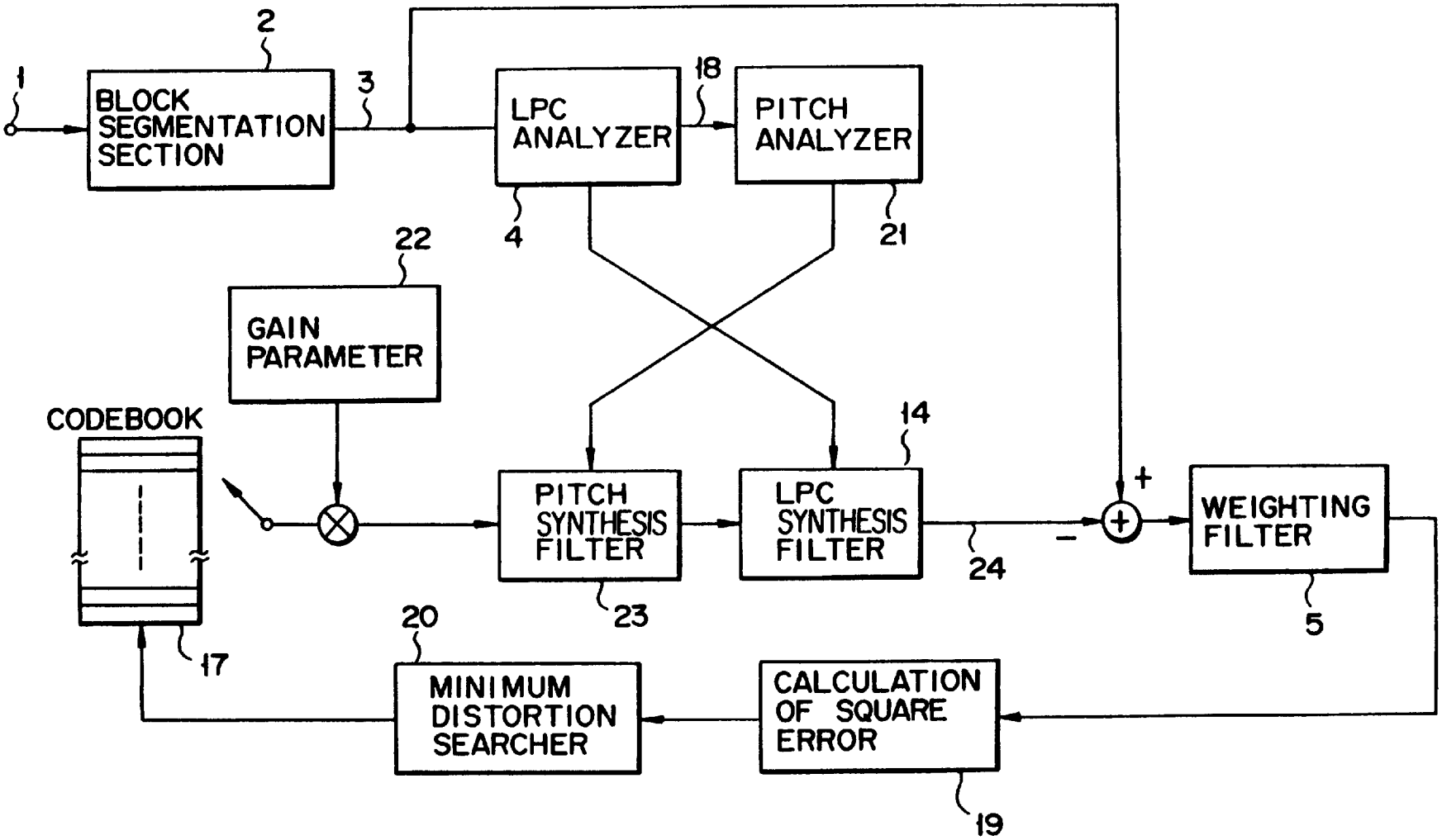
FIG. 7 PRIOR ART
FIG. 7 is a schematic block diagram explanatory of a conventional speech coding system.

Conversely, it is also possible for the speech coding system of the invention to shift the code vector by one sample lot from the forefront of the white noise matrix having n+K−1 of length. In this case, in order to recursively compute the number of $CH_j$ against each unit of "j", the speech coding system needs to execute multiplication by K(K=1)/2+(2K−1)(N−1) rounds. This obliges the system to execute additional multiplications by (K−1)(n−1) rounds, compared to the previous multiplication described above. When applying either the CELP system called "formation of closed loop" or "comptatible codebook" available for the pitch forecast shown in FIG. 1, or when applying the CELP system shown in FIG. 7, the content of the code book can be detected by replacing h(i) of H of the above equation (10) with $H(Z/\gamma)$ of the above equation (4).

It is also possible for the system shown in FIG. 1 to compute the pitch period delivered from the register 110 based on the frame unit by applying any conventional method like "auto correlation method" before delivery to the waveform coupler 130.

Figure 6:
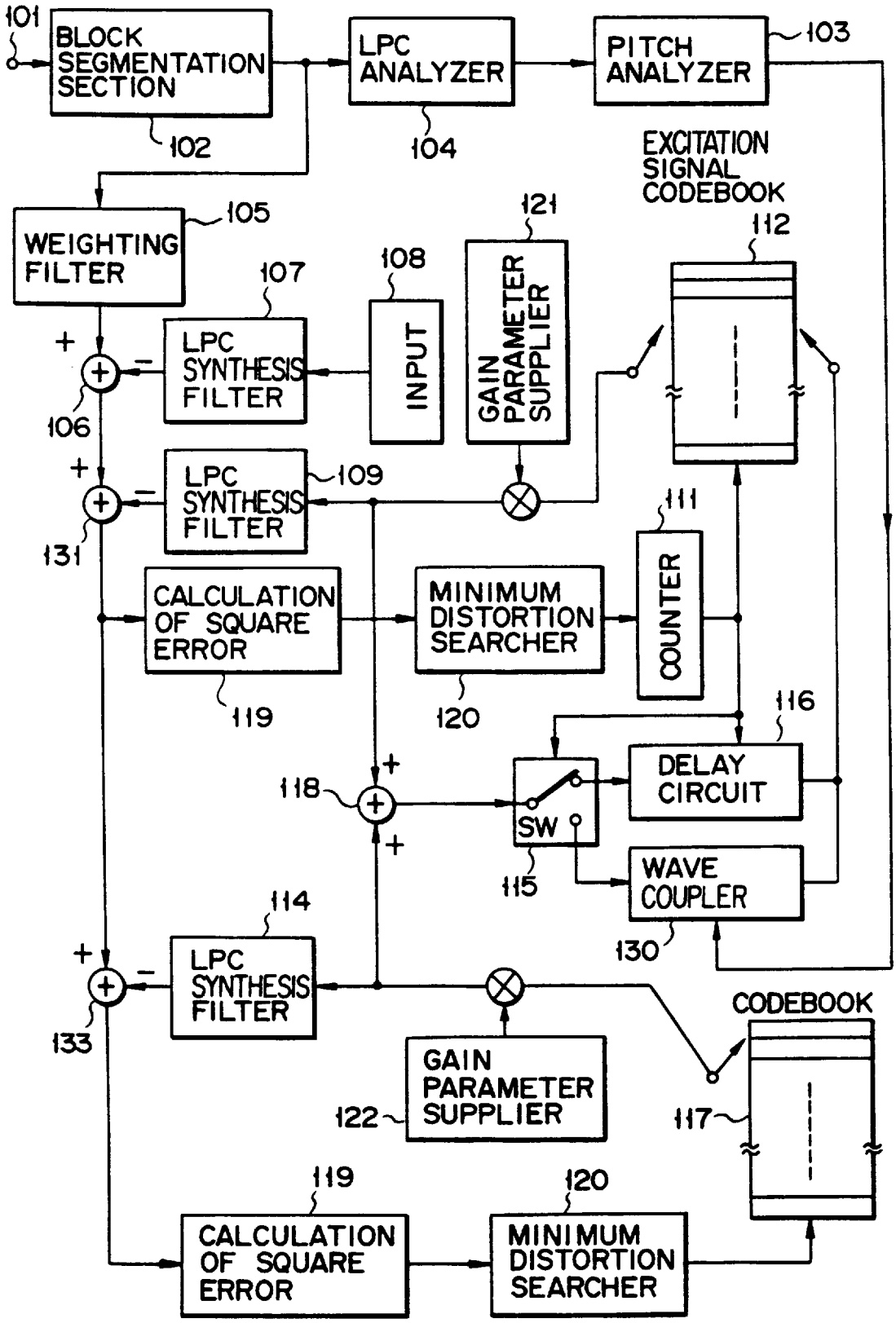
FIG. 6 is a schematic block diagram of another embodiment of the speech coding system of the invention.

FIG. 6 is a block diagram designating the principle of the structure of the speech coding system related to the above embodiment. The speech coding system according to this embodiment can produce the drive signal vector by combining a zero vector with the previous drive signal vector "e" for facilitating the operation of the waveform coupler 130 when the pitch period "j" is less than "K". By execution of this method, the total rounds of computation can be reduced further.

As is clear from the above description, as the primary effect of the invention, when executing pitch forecast called either the "closed loop" or the "compatible codebook", the speech coding system of the invention can recursively compute a filter operation by effectively applying a characteristic of the Toeplitz-matrix formation of the drive signals. Furthermore, when detecting the content of the codebook, the speech coding system of the invention can recursively execute filter operation by arranging the code-book matrix into the Toeplitz matrix, thus advantageously decreasing the total rounds of computing operations.

Next, the methods of computing the gain parameter $r_j$ shown in the above equation (15) pertaining to the detection of the pitch, the gain parameter $r_j$ shown in the above equation (18)pertaining to the pitch period "j" and the detection of the content of the code book, and the code-book index "j", are respectively described below.

The speech coding system of the invention can detect the pitch and the content of the codebook by applying the identical method, and thus, assume that the following two cases are present.

| | | |
|---|---|---|
| $u_j = v_j$, | $G_j = \gamma_j$; | Case: pitch |
| $u_j = w_j$, | $G_j = \gamma_i$; | Case: Code book |

Step 21a shown in FIG. 12 computes power $B_i$ of the vector $u_i$ generated from the prospective index i by applying the equation (B7) shown below. If the power $B_i$ could be produced from "off-line", it can be stored in a memory (not shown) for reading as required.

$$B_i = \sum_{n=1}^{L} [u_i(n)]^2 \tag{B7}$$

Figure 14:
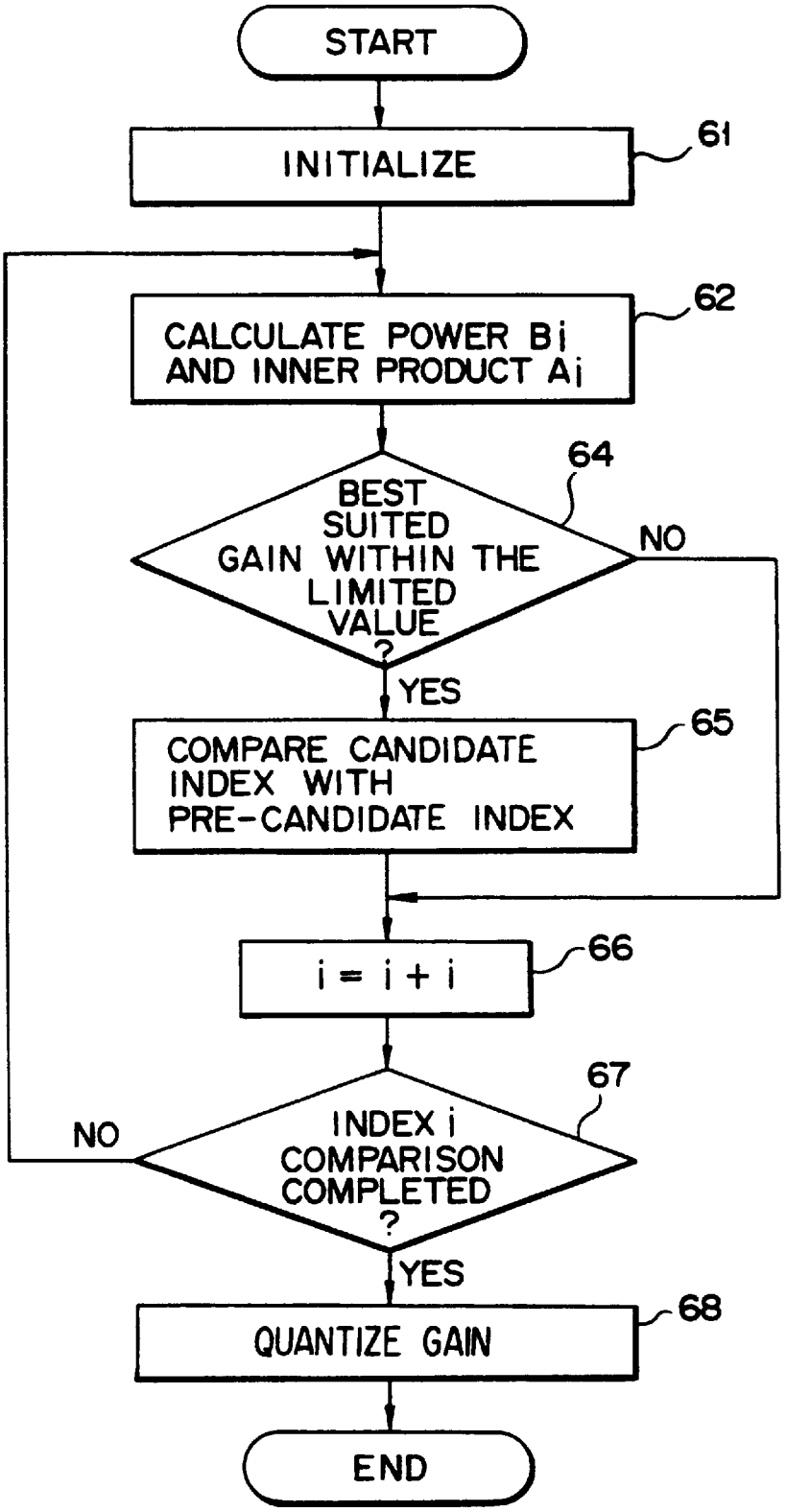
FIG. 14 is a flowchart designating the procedure of vector quantization according to a modification of the first embodiment of the invention.
Figure 15:
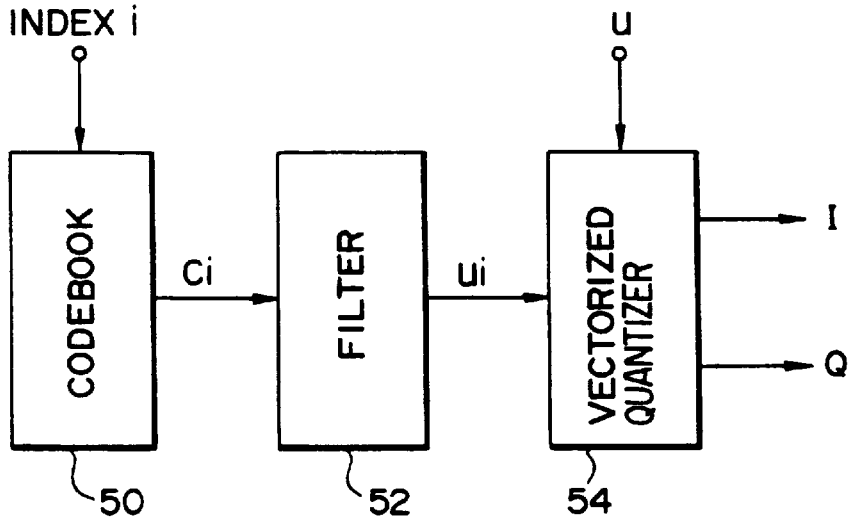
F I G. 15 PRIOR ART
FIG. 15 is a simplified block diagram of an example of a vector quantization system incorporating filters.
Figure 16:
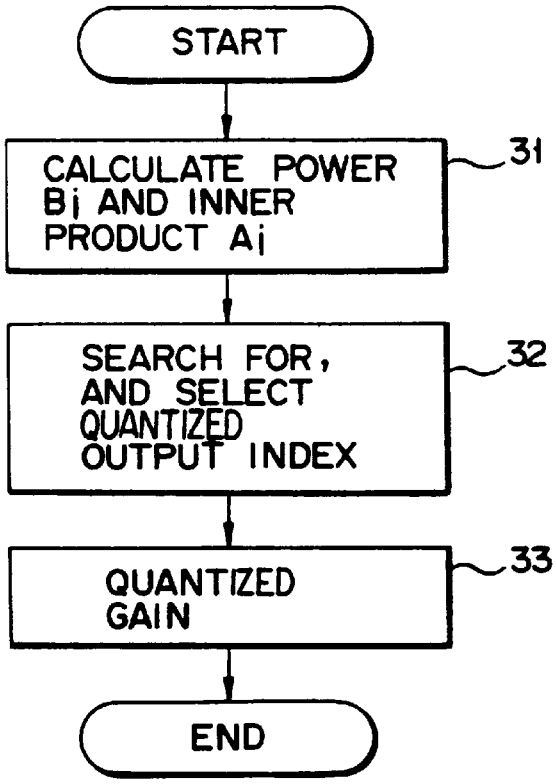
F I G. 16 PRIOR ART
FIG. 16 is a flowchart designating the procedure of a conventional vector quantization system.

Step 62 shown in FIG. 14 computes the inner product value $A_i$ of the vector ui and the target vector $X_t$ by applying the equation (B6) shown below.

$$A_i = \sum_{n=1}^{L} X_i(n)u_i(n) \tag{B6}$$

Step 22 checks to see if the optimal gain $G_i$ is out the range of the critical ,value of the gain, or not. The critical value of the gain consists of either the upper or the lower limit value of the predetermined code vector of the gain table, and yet, the optimal gain $G_i$ is interrelated with the power $B_i$, the inner product value $A_i$, and the equation (B8) shown below. Only the index corresponding to the gain within the critical value is delivered to the following step 23.

$$G_i = \frac{A_i}{B_i} \tag{B8}$$

When step 23 is entered, by applying the power $B_i$ and the inner product value $A_i$, the speech coding system executes detection of the index containing the assessed maximum value $A_i/B_i$ against the index i specified in the last step 22 before finally selecting the quantized output index.

When step 24 is entered, by applying the power and the inner product value based on the quantized output index selected in the last step 23, the speech coding system of the invention quantizes the gain pertaining to the above equation (B8).

Not only the method described above, but the speech coding system of the invention also quantizes the gain in step 24 by sequentially executing steps of directly computing an error between the target value and the quantized vector by applying the quantized value of the gain table for example, followed by detection of the gain quantized value capable of minimizing the error, and finally selects this value.

Figure 12:
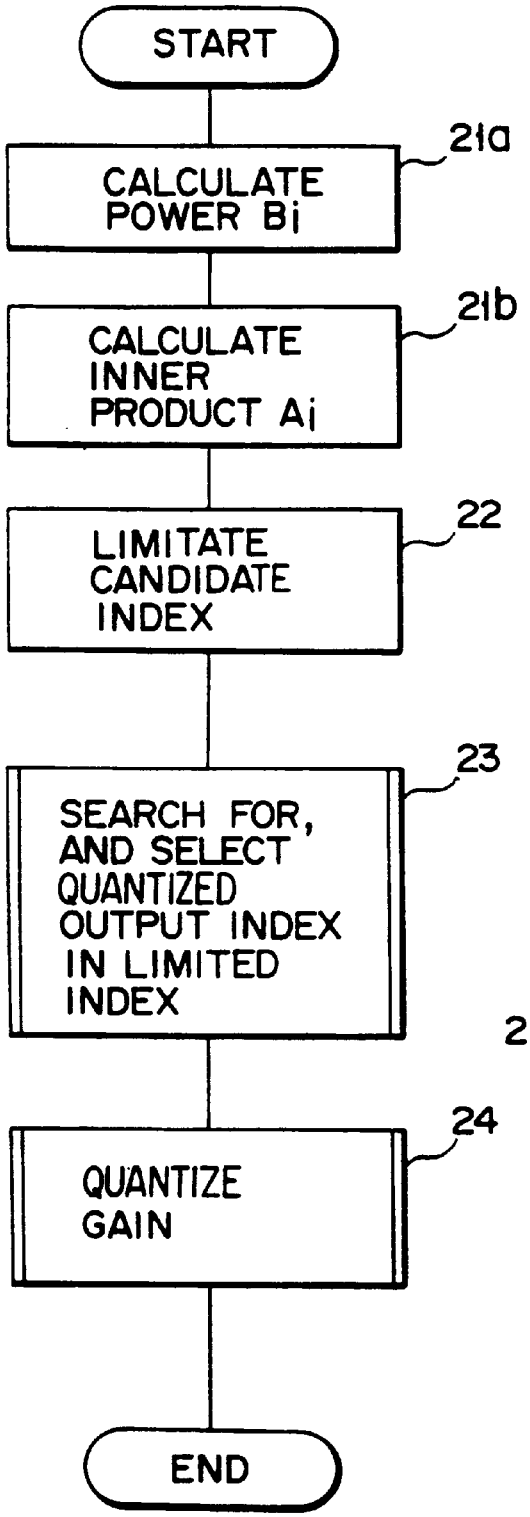
FIG. 12 is a flowchart designating the procedure of vector quantization according to the first embodiment of the invention.
Figure 13:
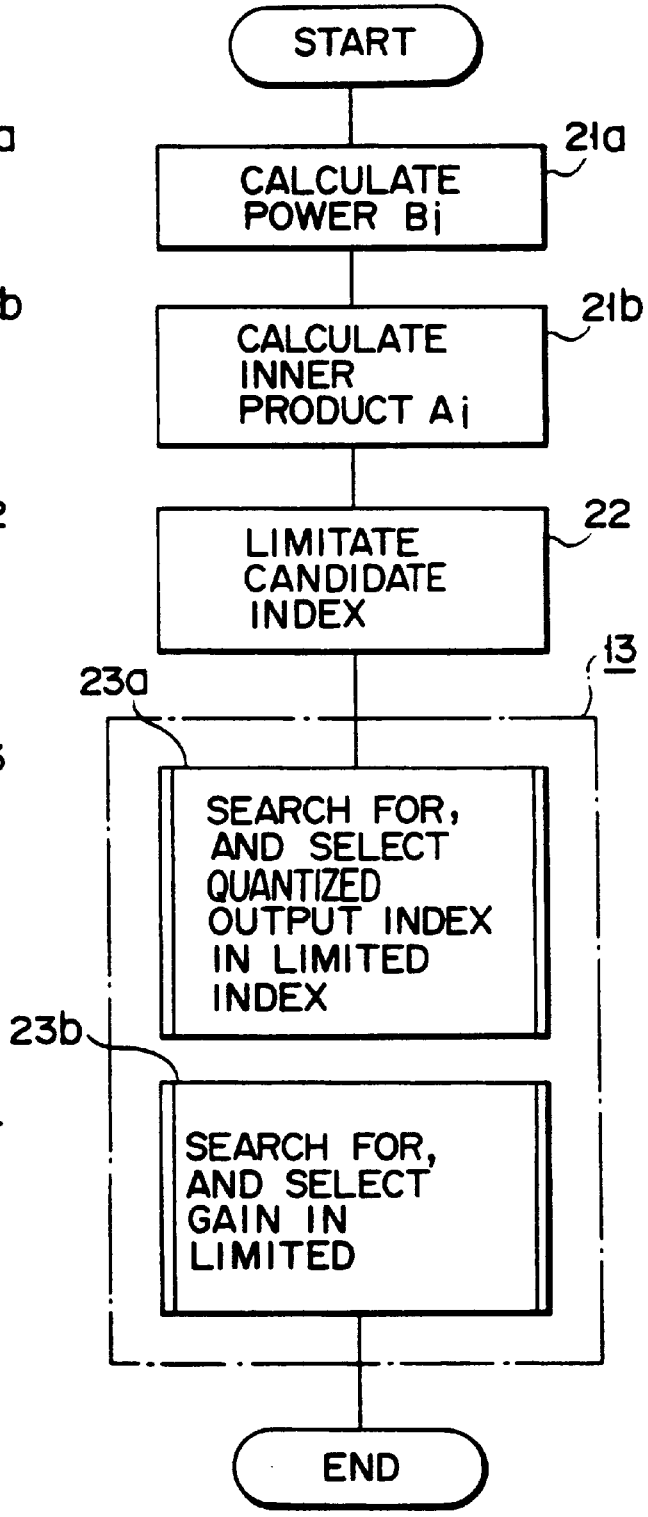
FIG. 13 is a flowchart designating the procedure of vector quantization according to the second embodiment of the invention.

Those steps shown in FIG. 13 designated by those reference numerals identical to those of FIG. 12 are of the identical content, and thus the description of these steps is deleted.

When step 13 is entered, the speech coding system detects the index and the quantized gain output value capable of minimizing the error of the quantized vector against the specific index i determined in process of step 22 before eventually selecting them.

The speech coding system of this embodiment detects an ideal combination of a specific index and a gain capable of minimizing the error in the quantized vector for the combination of the index i and q by applying all the indexes i' and all the quantized gain values Gq in the critical value of the gain in the gain table, and then converts the combination of the detected index value i and q into the quantized index output value and the quantized gain output value.

The embodiment just described above relates to a speech coding system which introduces quantization of the gain of vector. This system collectively executes common processes to deal with indexes entered in each process, and then only after completing all the processes needed for quantizing the vector, the system starts to execute the ensuing processes. However, according to the process shown in FIG. 12 for example, modification of process into a loop cycle is also practicable. In this case, step 62 shown in FIG. 14 computes the inner product value $A_i$ of the vector $u_i$ and the target vector $X_t$ against index i by applying the above equation (6), and then after executing all the processes of the ensuing steps 64 and 65, the index i is incremented to allow all the needed processes to be executed for the index i+1 in the same way as mentioned above. When introducing the modified embodiment, the speech coding system detects and selects the quantized output index in step 65 for comparing the parameter based on the presently prospective index i to the parameter based on the previously prospective index i−1, and thus, the initial-state-realizing step 61 must be provided to enter the parameter available for the initial comparison.

As the secondary effect of the invention, the speech coding system initially identifies whether the value of the optimal gain exceeds the critical value of the gain, or not and then, based on the identified result, prospective indexes are specified. As a result, the speech coding system can select the optimal index by eliminating such indexes which cause the error of the quantized gain to expand. Accordingly, even if the gain is quantized after selection of the optimal index, the speech coding system embodied by the invention can securely provide stable and high quality vector quantization.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A speech coding system, comprising:

means for receiving an input speech signal and outputting said input speech signal in the form of an input speech vector having one frame of unit;

analyzing means for analyzing said input speech vector by means of a linear predictive coding method and extracting a predictive parameter [rom] *from* said input speech vector;

weighting means for weighting said input speech vector with said predictive parameter from said analyzing means, and for outputting a first weighted input speech vector;

a first synthesis filter for outputting a zero-input speech vector;

a first substraction means for producing a difference between said first weighted input speech vector and said zero-input speech vector;

a means for preventing influence of a last frame and influence of a pitch from said first weighted input speech vector;

an excitation signal vector generating means for generating a first excitation signal vector when a target pitch period exceeds a predetermined value, and for generating a second excitation signal vector when said target pitch period is below said predetermined value;

a computing means for recursively executing one or more operations using a drive signal matrix using one of said first and second excitation signal vectors in the form of a first Toeplitz matrix when executing said one or more operations to determine an optimal pitch period at which an error between said first weighted input speech vector and *a synthesized vector obtained by using* said one of said first and second excitation signal vectors is a minimum;

a second synthesis filter for generating a synthesis speech vector corresponding to said optimal pitch period;

a third synthesis filter;

a codebook for generating a code vector for input to said third synthesis filter, said code vector being expressible in terms of a second Toeplitz matrix;

a second subtraction means for producing a difference between the output of said first subtraction means and said synthesis speech vector corresponding to said optimal pitch period;

a third subtraction means for producing a difference between the output of said second subtraction means and said second synthesis filter; and a selection means for selecting from said codebook an optimal code vector used to provide stable quality vector quatization such that said difference between the output from said third synthesis filter and said second weighted input speech vector is minimized.

2. The speech coding system according to claim 1, wherein said excitation signal vector generating means includes:

a delay circuit and a waveform coupling means which synthesize a predetermined speech waveform and speech waveforms preliminarily stored in a storage means for storing a previous speech waveform; and wherein said excitation signal vector generating means is connected to a switching means which, in accordance with a predetermined condition, switches the destination of the excitation signal vector delivered from said excitation signal vector generating means either to said delay circuit or to said waveform coupling means.

3. The speech coding system according to claim 2, wherein, if said optimal pitch period exceeds a dimensional number of said code vector, said switching means provides an excitation signal vector from said excitation signal vector generating means to said delay circuit, whereas if said pitch period is less than the dimensional number of said code vector, said switching means provides an excitation signal vector from said excitation signal vector generating means to said waveform coupling means;

wherein said delay circuit delays said pitch period by a predetermined amount and said waveform coupling means couples a zero-vector with a previous excitation signal vector so as to produce a new excitation signal vector.

4. The speech coding system according to claim 2, further comprising a pitch analyzing means which is connected to said analyzing means for executing pitch analysis for implementing long-term speech forecast by applying a forecast parameter extracted rom said analyzing means and also applying a forecast residual signal vector designating a predictive error, and wherein said pitch analyzing means extracts a pitch period resulting from said pitch analysis and an optimal gain parameter suited for said pitch period, and outputs the value of said optimal gain parameter to said waveform coupling means.

5. A speech coding system, comprising:

an input speech means which, upon receipt of an input speech signal, generates an input speech vector;

a weighting means which weights the input speech vector by means of a predetermined parameter and generates a weighted input speech vector;

an excitation signal vector generating means which extracts and generates an excitation signal vector from a filter excitation signal for driving a linear predictive coding check filter;

a computing means for recursively executing operations by using a drive signal matrix having the excitation signal vector represented by a Toeplitz matrix when executing the operations to determine an optical pitch period at which an error between the weighted input speech vector and the excitation signal vector is at a minimum; and output generating means for outputting a speech vector corresponding to the optimal pitch period.

6. The speech coding system according to claim 5, wherein said excitation signal vector generating means includes means for generating the excitation signal vector including a first excitation signal vector generated when a pitch period exceeds a predetermined value and a second excitation signal vector produced when the pitch period is below the predetermined value.

*7. A speech coding system, comprising:*

*an input speech means which upon receipt of an input speech signal, generates an input speech vector;*

*a weighting means which weights the input speech vector by means of a predetermined parameter and generates a weighted input speech vector;*

*an excitation signal vector generating means which extracts and generates an excitation signal vector from a filter excitation signal for driving a linear predictive coding filter which outputs a synthesized vector;*

*a computing means for recursively executing operations by using a drive signal matrix having the excitation signal vector represented by a Toeplitz matrix when executing the operations to determine an optimal code vector such that an error between the weighted input speech vector and the synthesized vector is at a minimum; and*

*output generating means for outputting a speech vector corresponding to the optimal code vector.*

* * * * *